No. 662,791. Patented Nov. 27, 1900.
C. HUBER.
METHOD OF UNITING METAL SURFACES BY MEANS OF FLUID PRESSURE.
(Application filed Jan. 29, 1900.)
(No Model.)
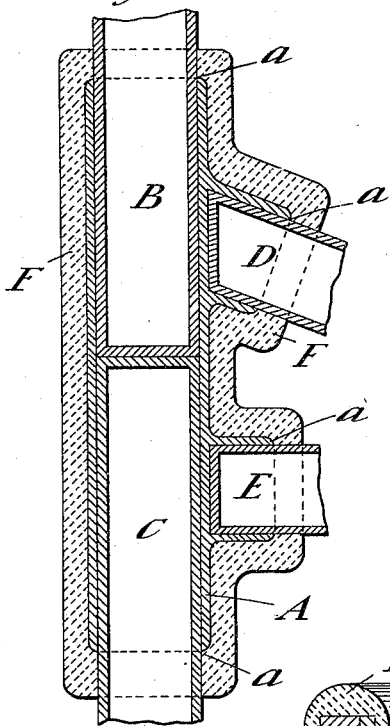
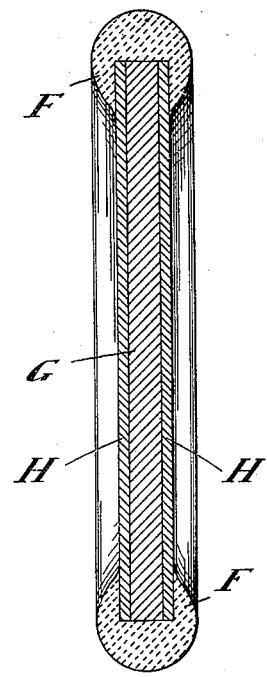
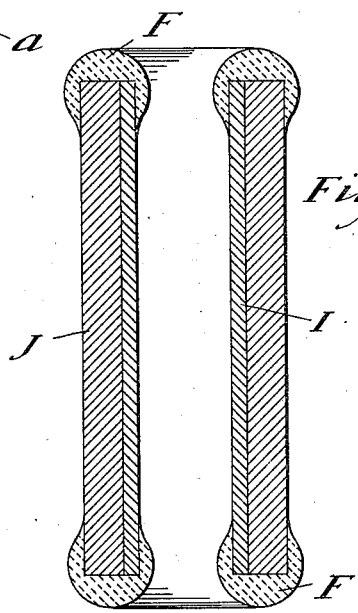

UNITED STATES PATENT OFFICE.

CARL HUBER, OF CARLSRUHE, GERMANY.

METHOD OF UNITING METAL SURFACES BY MEANS OF FLUID-PRESSURE.

SPECIFICATION forming part of Letters Patent No. 662,791, dated November 27, 1900.

Application filed January 29, 1900. Serial No. 3,207. (No model.)

*To all whom it may concern:*

Be it known that I, CARL HUBER, a citizen of Austria, residing at 38 Beiertheimer Allee, Carlsruhe, Baden, in the Empire of Germany, have invented a certain new and useful Method of Uniting Metal Surfaces by Means of Fluid-Pressure, (for which application has been made for a patent in Great Britain, dated July 3, 1899, No. 13,735,) of which the following is a specification.

It has been proposed to effect the uniting or welding together of metal objects by the agency of fluid-pressure by fitting together the surfaces of the said objects to be united and then placing them within strong divided molds, so that the outer surface of the one object abuts against the mold, while the outer surface of the other object is subjected to powerful fluid-pressure exerted within the mold, whereby the inner surfaces of the two objects are pressed together with such force as to become firmly united together. This method of operating is subject to numerous disadvantages, among which may be mentioned the great expense necessarily entailed in providing a strong mold for every different shape of the objects to be united and the great difficulty experienced in making the joints of the divided mold sufficiently strong and fluid-tight to resist the very high pressure to which the fluid in the mold requires to be subjected.

The present invention has for its object to entirely do away with the necessity of a strong mold or jigger and overcome the disadvantages set forth in the preceding paragraph; and it consists simply in fitting together the surfaces of the objects to be united together and then hermetically inclosing such surfaces by applying all around the meeting edges a plastic impermeable packing material, after which the entire combined objects are placed freely within a strong chamber charged with suitable fluid, which is then subjected to a very high pressure by a suitable known means. Thus the fluid-pressure thus produced is exercised over the whole of the exposed surfaces of the combined objects, but is effectually prevented by the said impermeable packing material from gaining access to the inclosed surfaces to be united, so that the pressure exerted externally on the exposed parts will force the said surfaces in contact with each other with such power that they become firmly united together. This method of operating can be applied to a great variety of purposes. Thus it may be used for uniting two or more tubes together—such, for example, as for making the tubular joints of cycle-frames. In this application, a part of one tube having been fitted into a part of another tube or into a tubular socket to which it is to be united, the communications with the surfaces in contact of the tubes or of the tube and socket are closed by suitable means, such as by a packing of caoutchouc or other material, or by soldering or tinning, or by inclosing the joined tubes in an envelop of closely-adhering more or less plastic substance. Upon then introducing the tubular frame into the before-mentioned pressure-chamber and filling this with the fluid or plastic pressure medium this will not only surround the outer surface of the frame, but also the interior thereof, so that when the pressure medium is subjected to a sufficiently-powerful pressure, such as by the plunger of a hydraulic press entering an aperture in the pressure-chamber, the tubular joint will be subjected to such pressure both on its inner and outer surfaces that the surfaces in contact will be forced together, so as to become firmly united. It is to be observed that with the above-described method of operating it is necessary that the ends of the tubes B, C, D, and E that are within the socket-piece A shall be closed up, as shown, in order that the liquid under pressure may not gain access to the inner meeting edges of the surfaces in contact, as these edges are not inclosed by the plastic material. In like manner any number of tubes fitted one within the other may be firmly united together by closing the annular interstices between the tubes at the ends by suitable packing and then subjecting the interior of the innermost tube and the exterior of the outermost tube to the action of the pressure medium, as above described. In this manner gun-barrels, ordnance, pressure-chambers, and the like can be built up of a number of concentric tubes.

The invention is also applicable to the coating of sheet metal or tubular metal objects with another metal, such as for coating copper, brass, iron or steel plates or tubes with silver, nickel, aluminium, and the like. For this purpose it is only necessary to close the interstices between the metal plates at the edges of the plates by suitable packing or, in the case of flat plates or objects, to inclose them entirely in a flexible or plastic and hermetically-closed envelop, and then subject them to the action of the pressure medium within the pressure-chamber, as described.

Figure 1 illustrates a longitudinal section of a tubular socket-piece. Fig. 2 illustrates a cross-section of a metal plate. Fig. 3 illustrates a vertical section of two or more concentric tubes.

Fig. 1 of the accompanying drawings shows by way of example a longitudinal section of a tubular socket-piece A, to which tubes B C D E are to be united by hydraulic pressure by the above-described method. For this purpose the said tubes having had their surfaces suitably prepared and fitted into the socket-piece A the crevices between the extremities of the socket at *a a a* are hermetically inclosed by a suitable plastic impermeable packing material F, and the combined parts are then placed within a strong chamber, of any suitable construction, which after being closed is charged with liquid under high pressure. This pressure in acting both against the inner surfaces of the tubes B C D E and upon the outer surfaces of the socket-piece A through the medium of the plastic material F will cause the surfaces of the tubes and socket that are in contact to be firmly united or welded together.

It is to be observed that with the above-described method of operating it is necessary the ends of the tubes B, C, D, and E that are within the socket-piece A shall be closed up, as shown, in order that the liquid under pressure may not gain access to the inner meeting edges of the surfaces in contact which are not inclosed by the plastic material.

Fig. 2 shows a cross-section of a metal plate G, which is to be coated on one or both sides with thin plates or foils of another metal H, such as gold or silver. For this purpose the surfaces to be united being suitably prepared in any well-known manner the parts G and H are fitted together, and the peripheral edges having been hermetically inclosed by plastic impermeable packing F the combined plates are introduced into a chamber charged with pressure fluid and are there subjected to a high pressure on all the exposed surfaces, so that the plates or foils H will be firmly united to the plate G by means of such pressure. It will be seen that in this figure G may also represent a cylindrical bar of metal over which is slid a closely-fitting tube H of another metal, so that on the ends being hermetically inclosed by the packing material F and the whole subjected to fluid-pressure the tube H will be pressed against the bar G with such pressure as to be firmly united therewith. In like manner two or more concentric tubes or cylinders I and J, Fig. 3, may be firmly united together by hermetically inclosing the meeting edges at the ends by plastic packing F and then subjecting them internally and externally to fluid-pressure, as before.

It will be seen in all the above-described applications of the invention that although the packing F is of a plastic nature, and therefore liable to yield to pressure, it cannot be deformed by the fluid-pressure to which it is subjected, because such pressure being exerted equally upon every part of its outer surface the pressure exerted upon one part will be perfectly balanced by the pressure upon another part and cannot therefore produce any deformation.

The pressure-chambers for carrying out my said invention may be of any suitable known construction; but by preference I employ for this purpose pressure-chambers such as are described in my application bearing equal date herewith.

Having thus described the nature of this invention and the best means I know for carrying the same into practical effect, I claim—

1. In a method of uniting metal surfaces by means of fluid-pressure, hermetically inclosing the contiguous surfaces to be united by the application of plastic impervious packing material over the meeting edges of the surfaces and subjecting the whole to liquid-pressure in a chamber, substantially as described.

2. In a method of uniting the surfaces of metal tubular objects by means of fluid-pressure, hermetically inclosing the contiguous surfaces of the tubular objects by the application of plastic impervious material over the joint between the two surfaces and subjecting the whole to liquid-pressure in a chamber, substantially as described.

In testimony whereof I have hereunto set my hand in presence of two subscribing witnesses.

CARL HUBER.

Witnesses:
 JACOB ADRIAN,
 CARL BLATT.